Figure 1:
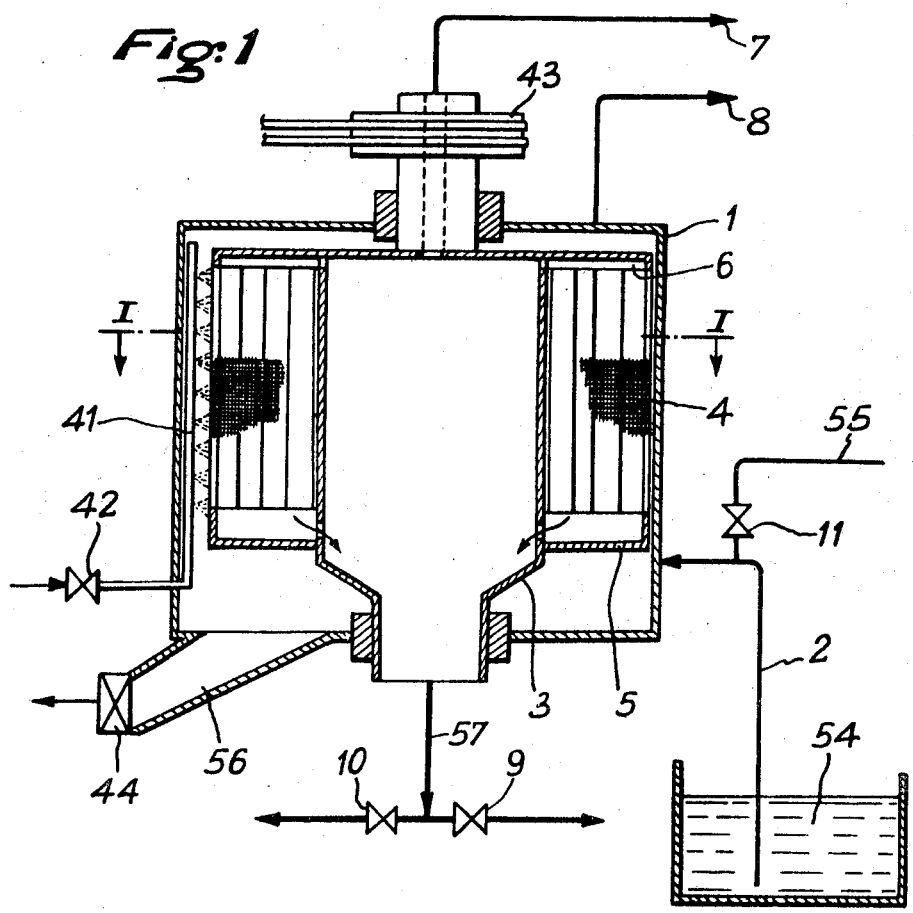

United States Patent

Lamort

[15] 3,647,071
[45] Mar. 7, 1972

[54] APPARATUS FOR CLARIFYING LIQUIDS CONTAMINATED BY MATERIALS IN SUSPENSION, MORE PARTICULARLY WASTE WATER FROM PAPER MACHINES

[72] Inventor: Pierre Lamort, 47 rue du Bac 51, Vitry-le-Francois, France

[22] Filed: Aug. 6, 1969

[21] Appl. No.: 847,882

[30] Foreign Application Priority Data

Aug. 7, 1968 France.....................................162168

[52] U.S. Cl...............................210/107, 210/108, 210/143, 210/332, 210/398, 210/487
[51] Int. Cl........................................................B01d 33/02
[58] Field of Search................210/85, 94, 96, 108, 333, 398, 210/391, 393, 331, 107, 143, 332, 487

[56] References Cited

UNITED STATES PATENTS

| | | | |
|---|---|---|---|
| 1,227,983 | 5/1917 | Vallez | 210/331 X |
| 2,299,529 | 10/1942 | Crampton | 210/96 |
| 2,651,418 | 9/1953 | Prendergast | 210/332 |
| 2,655,265 | 10/1953 | Little | 210/398 |
| 2,868,379 | 1/1959 | Hunziker | 210/391 X |
| 3,297,163 | 1/1967 | Landon | 210/332 X |
| 3,302,796 | 2/1967 | Downey | 210/85 X |
| 3,471,026 | 10/1969 | Riker | 210/331 X |
| 3,513,090 | 5/1970 | Migule et al. | 210/332 X |

*Primary Examiner*—John Adee
*Attorney*—Michael S. Striker

[57] ABSTRACT

A filtering apparatus for batchwise operation in which a tank contains filter means in the path of liquid to be filtered the downstream side of the filter means communicating with a filtrate collector and jets for directing a liquid on to the filter means after a batch has been processed, to dislodge the extract from the filter means.

9 Claims, 12 Drawing Figures

INVENTOR:
PIERRE LAMORT

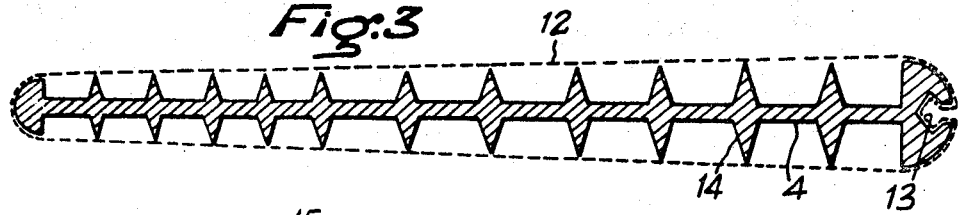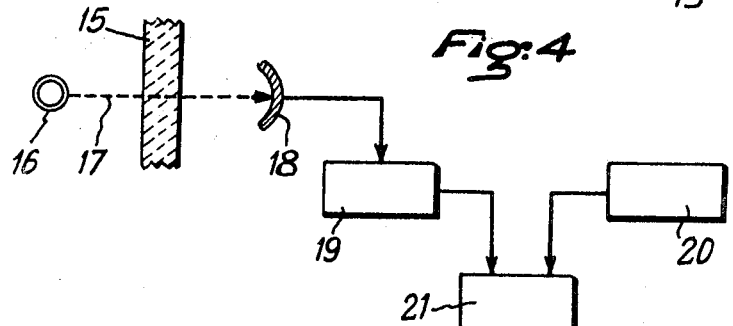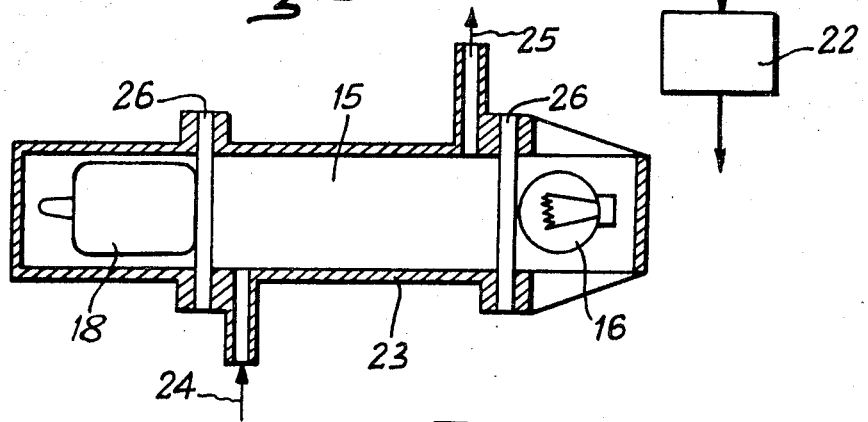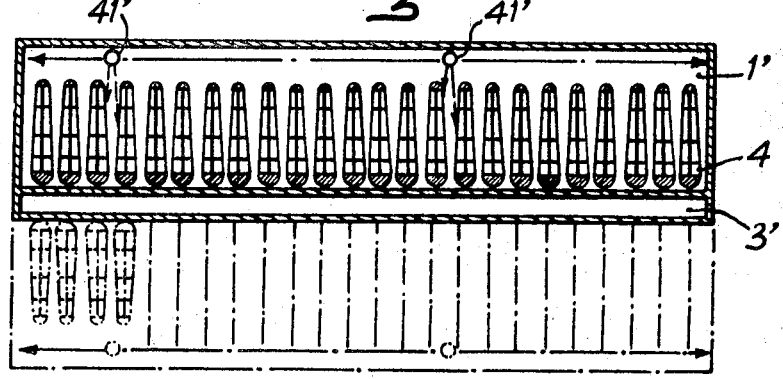

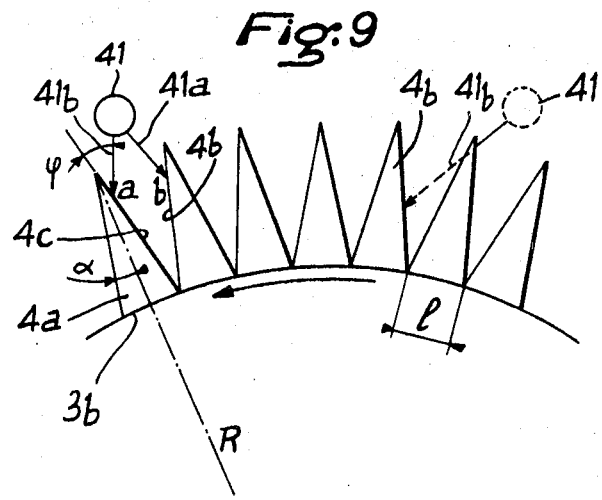
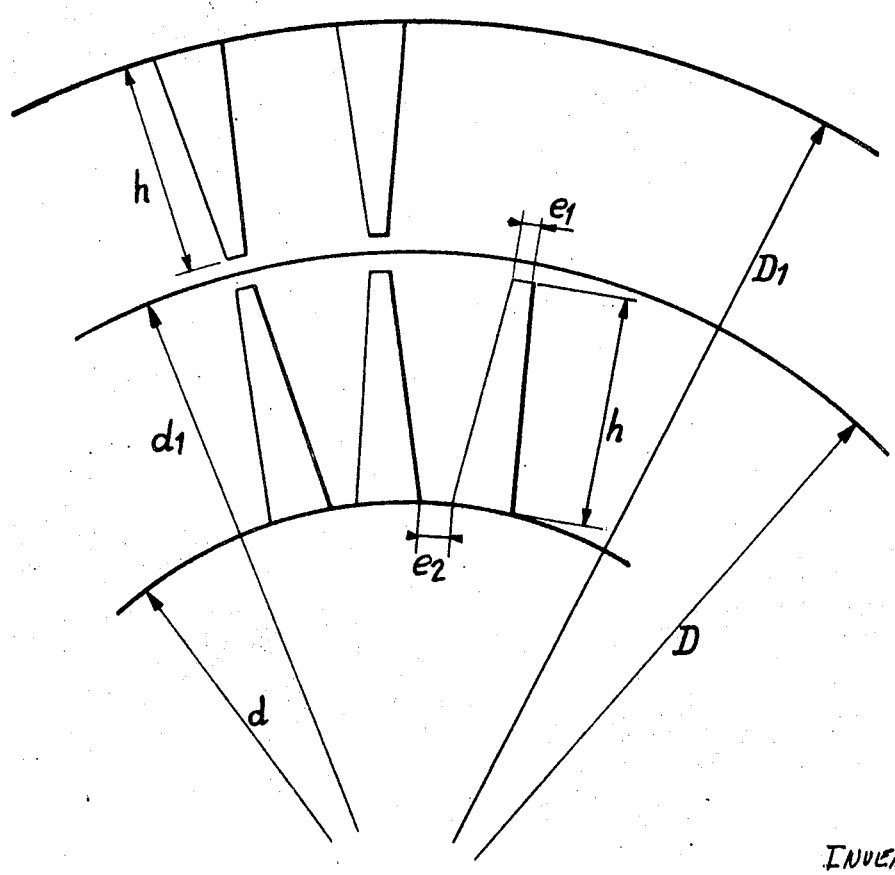

APPARATUS FOR CLARIFYING LIQUIDS CONTAMINATED BY MATERIALS IN SUSPENSION, MORE PARTICULARLY WASTE WATER FROM PAPER MACHINES

The present invention concerns apparatus for clarifying liquids contaminated by materials in suspension, more particularly waste water from paper machines.

Such apparatus is known which operates continuously and wherein filtering surfaces are unclogged by causing hydrodynamic profiles to pass upstream or downstream of them, the said profiles alternately setting up depression and excess pressure so that the fibers which have become fixed to the filtering surfaces are detached therefrom and drop down into the collector for retained materials. It is also known to unclog filtering surfaces by a large number of jets of liquid which detach the fibers which have been deposited on the said surfaces. This latter method is used more particularly with appliances wherein the part upstream of the filtering surfaces is completely filled with liquid, but wherein the part downstream of the said filtering surfaces is empty, so that the filtrate trickles along the filtering surfaces and is picked up at the bottom in a filtrate-collector.

The present invention has the object of providing a new filtering apparatus which makes it possible to keep a strict check on the composition of the filtrate, to obtain the maximum delivery of filtrate for a given filtering surface, and to reduce the energy required in order to convey the liquid to be clarified into the appliance.

The present invention relates to filtering apparatus for clarifying liquids contaminated with materials in suspension such as waste water from paper machines, the said apparatus being intermittently operable by filling the part upstream of the filter means in the apparatus and extracting the filtrate downstream of the said filter means, the supply of liquid for filtration being stopped and the appliance being drained each time it is required to clean the filter means and extract the filtrate, filling starting again after extraction of the said filtrate has stopped and after the filter means have been cleaned of retained particles; characterized in that the apparatus comprises a first tank with an inlet pipe for liquid to be clarified, a collector for retained particles with a drain valve, and a filtrate-collector disposed inside and/or outside the said tank and comprising an outlet with two valves whereof one governs the outlet of initial cloudy filtrate and the other subsequently governs the output of clarified filtrate after the first has been closed, the filter means comprising rectangular hollow frames covered with a metallic or textile cloth being disposed vertically to the walls of the filtrate-collector and communicating therewith by means of ducts provided for this purpose and a plurality of jets for liquid being directed at a predetermined angle towards the surfaces of the filters.

The apparatus may consist of a cylindrical external tank and a cylindrical filtrate-collector concentric with the tank, the ratio of the diameter of the tank to the height of the filtering frames being substantially equal to 0.25, the filtering frames having substantially parallel walls and being disposed on the said filtrate-collector.

The apparatus may comprise an arrangement for rotating the filtrate-collector together with the filtering frames, one or more rows of cleaning jets being provided, and all the filtering frames being cleaned by at least one complete revolution of the filtrate-collector with the aid of a reduction-gear drive.

The apparatus may comprise at least two concentric cylindrical supports for the filtering frames which are disposed radially and directed towards the center and outwardly with their ends facing one another, at least one of the said supports being rotatably mounted.

The apparatus may comprise filtering frames whereof the filtering surfaces are at an acute angle, the cleaning jets being directed at an angle of about 10° towards the filtering surfaces, at least one ramp of cleaning jets being disposed on each filtering frame support in a recess provided between the said filtering frames, the ramp of cleaning jets on one of the said supports being intended to clean the filtering frames on the other support.

The rows of cleaning jets may comprise two rows of jets each directed on to the faces on the same side of the filtering frames, the said frames being truncated at their apex in order not to mask the filtering surfaces from the cleaning jets and being disposed on the support with a certain clearance to facilitate cleaning, the frames according to this arrangement having a ratio of height to external diameter of about 0.1 to 0.2.

The apparatus may include a parallelepipedic external tank and a likewise parallelepipedic filtrate-collector disposed substantially on the longitudinal axis of the said tank, the filtering frames being cleaned by a ramp of cleaning jets moving in front of the said filtering frames.

An automatic check means may be provided to check the filtrate by measuring its transparency with the aid of a photoelectric cell for example, the signal thus obtained being fed to a preamplifier and then to a signal-comparator which receives a second signal for reference purposes by way of a reference-indicator and closes the first valve for cloudy filtrate and opens the second valve for clarified liquid when the filtrate attains a predetermined degree of transparency.

A first reservoir may be disposed with a head above the clarifying appliance, which reservoir is filled while the appliance is working by means of a pump and emptied into the part upstream of the filters on each filling cycle, a second reservoir disposed below the said clarifying appliance being intended to receive the liquid drained upstream of the filters, this draining being necessary in order to unclog the filtering frames, and to receive the first filtrate which is not yet sufficiently clarified in order to be taken off, the said second reservoir being compartmented in order to retain some of the liquid for the cleaning jets while the remainder is returned to the first reservoir by means of another pump.

Figure 2:
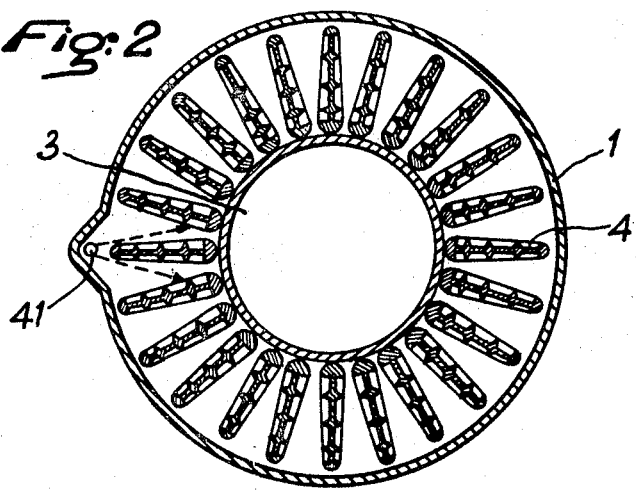
Figure 7:
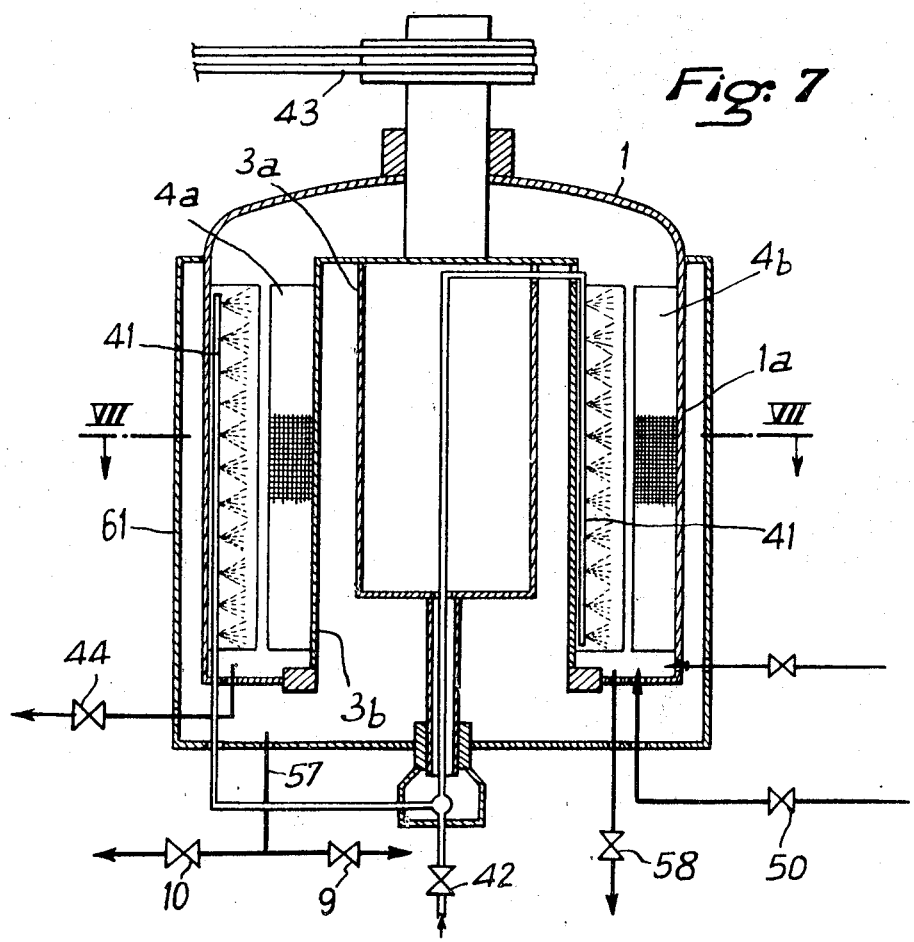
Figure 8:
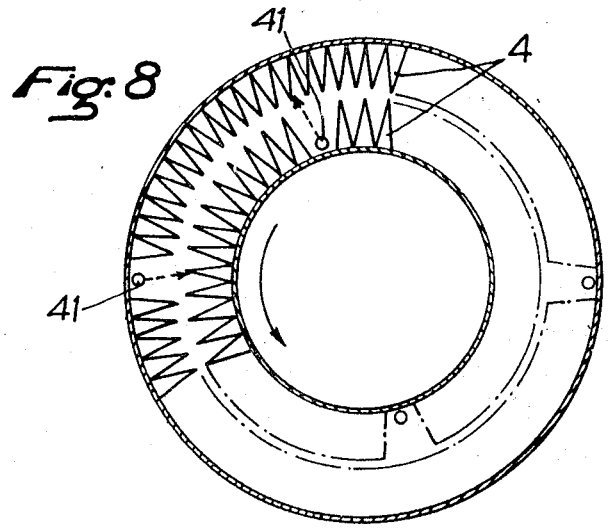
Figure 11:
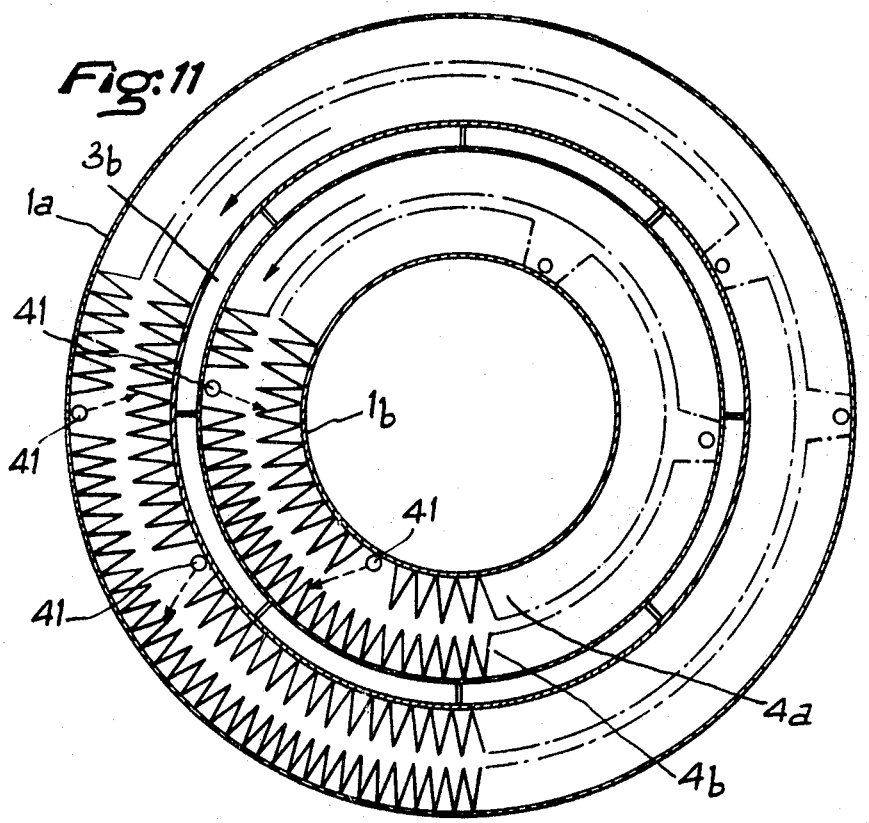
Figure 12:
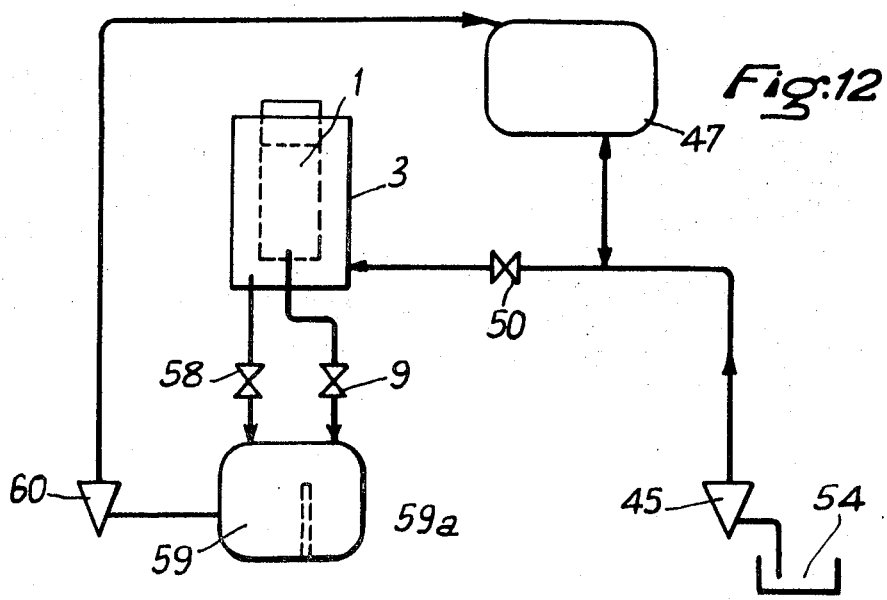

By way of example and in order to facilitate understanding of the subsequent description, the appended drawings comprise the following illustrations:

FIG. 1, a diagrammatic sectional elevation of an appliance for clarifying contaminated liquids, using vacuum as the source of driving power for the liquid to be clarified;

FIG. 2, a section along 1—1 in FIG. 1;

FIG. 3, a diagrammatic transverse section of a filtering frame;

FIG. 4, a functional diagram showing how separation of the first filtrate and the clarified liquid is governed;

FIG. 5, a longitudinal section of a readout device for governing separation of the liquids;

FIG. 6, a diagrammatic transverse section of an appliance having fixed frames and moving rinsers;

FIG. 7, a diagrammatic sectional elevation of an appliance for clarifying contaminated liquids according to another form of embodiment;

FIG. 8, a section along VII—VII in FIG. 7;

FIG. 9, a diagrammatic view showing the arrangement of the cleaning jets;

FIG. 10, a diagrammatic view indicating the profile of the filtering frames according to the invention;

FIG. 11, a sectional view giving another arrangement of the cleaning frames according to the invention;

FIG. 12, a diagrammatic view of the manner in which the clarifying appliance according to the invention is supplied with liquid.

The apparatus according to FIG. 1 consists of a tank 1 which is supplied with liquid for filtration by way of a supply pipe 2 which draws its supply from a vat 54, and the apparatus further consists of a cylinder 3 supporting the filtering frames 4 which are disposed radially as shown in FIG. 2.

At the bottom of the frames 4 there is a collector 5 to receive the liquid which has passed through the filtering layer deposited on the frames 4. This collector 5 communicates with the interior of the cylinder 3 so as to allow this liquid to flow through the axial part of the appliance.

At the top of the frames 4 there is another collector 6 also communicating with the interior of the cylinder 3. The top of the cylinder 3 is linked to a vacuum takeoff 7 which provides the necessary vacuum downstream of the filtering layer in order to obtain the pressure-difference required between the part upstream of the filtering layer and the part downstream of this same filtering layer.

The cylinder 3 constitutes an air/water separator, and may be set in rotation by the reduction-gear drive 43. A conduit 55 for a suspension which constitutes the filtering layer on the frames 4 opens out into the conduit 2, and may be separated therefrom by a valve 11.

In order that the particles retained on the frames 4 may be removed, there is a collector 56 at the bottom of the tank 1, normally closed by the valve 44. A row of rinsing jets 41 is furthermore disposed in a recess in the wall of the tank 1. Operation of these jets 41 is governed by the valve 42. The filtrate is removed from the cylinder 3 via a conduit 57 which leads to two valves 9, 10, the valve 9 being opened at the start of the filtering operation in order to discharge the first cloudy filtrate, and the valve 10 being subsequently opened in order to recover the clarified liquid. The tank 1 is filled by setting up a vacuum inside it via the vacuum takeoff 8.

The valve 9 in the path of the first filtrate and the valve 10 in the path of the clarified liquid are closed while the tank 1 is being filled.

The valve 11 is opened during this filling period, and the suspension which constitutes the filtering layer mixes with the liquid to be clarified. As a result of the valve 9 being opened, the liquid passes through the support of the filtering layer and causes this filtering layer to be formed over the whole surface of the support which serves for filtering purposes. The amount of this filtering layer is controlled by opening the valve 11 to a greater or lesser extent and for a longer or shorter time.

In order to carry out the operation of filling the tank 1 under the best possible conditions, it will immediately be realized that the greater the volume of liquid for clarification in the tank 1 the longer it takes to fill the latter, with a resultant loss of efficiency in using the appliance. Likewise, if the tank 1 is of greater volume, the driving force necessary in order to convey the liquid to be clarified increases with the volume provided that the appliance is unclogged and completely drained after each filling and filtering.

In order to remedy this disadvantage, it is proposed to use the minimum detrimental volume and to obtain the greatest possible filtering surface inside the tank 1.

Thus $h=0.25$ D is chosen for the appliance according to the invention because it will be possible to obtain the maximum filtering surface inside the tank 1, and because the volume occupied by the liquid to be clarified will not represent more than 75 percent of the total volume of the tank 1.

Under these conditions, idle periods due to conveyance of the volume are reduced, a feature which cannot be neglected in an appliance which operates intermittently. There is an appreciable economy in driving force provided that it is proportional to the volume of air to be emptied in the tank 1.

It should furthermore be noted that the delivery through the filters is not constant, but decreases more or less rapidly with time provided that the filtering layer is required to form at the beginning of each filtering cycle. It also follows that the first filtrate must be recycled since it is not yet sufficiently filtered. Now in order that the appliance may be effective it is very important to determine precisely the instant at which the filtrate is acceptable, that is to say the instant at which the valve 9 is to be closed and the valve 10 is to be opened, since it is at this instant that there is maximum delivery, and a loss of delivery because of the valve 10 being opened too late signifies a very great loss of efficiency.

Furthermore, if it is desired to obtain uniform clarification and a given value of clarity at the instant of separating the liquids between the first filtrate and the clarified liquid which is identical on each filtering cycle, it is necessary to alter the instant at which the valves 9 and 10 change over. A permanent check is maintained on the liquid flowing through the filtering layer in order that the value of this changeover point may always be made identical for a given liquid, and in order that there may be the benefit of a large delivery at the start of operations. This permanent check is carried out by examining the translucency of the liquid. A device containing a layer 15 of liquid to be checked is provided for this purpose (FIG. 4). A generator 16 emits radiation 17, and this radiation passes through the liquid 15. The amount of radiation 17 absorbed by the liquid 15 is checked by a receiver 18. The receiver 18 represents this by possible variations in absorption in accordance with the amount of contaminants or particles being conveyed by the liquid 15. These variations are converted into an electrical signal and fed to an amplifier 19. An electrical signal emanates in parallel from a reference-indicator 20. This reference signal 20 is adjustable at will by the user according to the quality of the liquid to be clarified and according to the clarity desired at the instant of separation of the two liquids. The signals emanating from the amplifier 19 and the reference-indicator 20 are compared by a system 21 known as a comparator.

When the signal 19 is smaller than the signal 20, the liquid 15 being checked is not yet sufficiently clarified to be separated. When the signal 19 is identical with the signal 20, it means that the liquid being checked conforms as regards clarity with the reference signal 20 and the valve 9 is closed while the valve 10 is opened.

In order more clearly to illustrate the description, use will be made of the following example which is nevertheless not limitative to the system advocated above. By way of example, FIG. 5 illustrates a device consisting of a readout member 23 linked to an input 24 by a branch circuit taken off downstream of the filtering layer on the frames 4. The liquid to be checked is caused to circulate inside this readout member 23 and to emerge at 25. At each end of the readout member 23 there is a transparent glass 26. On one side of the readout member 23 and outside the glass 26, there is a lamp 16 whereof the luminous radiation passes through the liquid inside the readout member 23. At the other end there is a photoelectric cell 18. According to whether the luminous radiation undergoes more or less absorption, the photoelectric cell 18 will register the varying absorption of the luminous radiation and transform it into a varying electrical signal conforming to the opacity of the liquid, and according to whether there are more or fewer contaminants or particles in this liquid. Under these conditions, a pickup as set out above is available.

As the filtering layer becomes thicker, the delivery of clarified liquid decreases until it would tend to drop to zero if the filtering cycle were prolonged. In order that the appliance may be used under conditions of good efficiency, a minimum delivery is determined in advance and the filtering layer is unclogged. For this purpose, the tank 1 is drained and the whole filtering surface is subjected to a cleaning cycle with the aid of one or more rinsing ramps 41 (FIGS. 1, 2, 6, 7). In order to drain the tank 1, its interior is placed in communication with atmospheric pressure. The liquid in the tank 1 flows back through the supply pipe 2.

Cleaning is carried out by opening the valve 42 which supplies the rinsers with a liquid under pressure, which may in this instance be the same liquid as that which is to be clarified. The rotor 3 supporting the frames 4 is set in rotation by way of the control 43 linked to a reduction-gear drive, and the whole of the filtering surface moves past in front of the rinsers 41. The rinsing jet is directed at a favorable angle with respect to the generatrix of a frame 4 in order easily to unclog the filtering layer.

This layer drops down, and is picked up at the bottom of the tank 1. Opening of the valve 44 makes it possible to recover this layer, which is thickened with respect to the liquid to be clarified.

The valves 9 and 10 are closed during this cleaning period.

In order to restart a new clarifying cycle, the valves 42, 44 are closed again, the rotor 43 is stopped and vacuum is restored in the tank 1 of the appliance by way of the conduits 7 and 8 linked to the vacuum source.

By extending the system described above, and without any change in the principle of operation, the cylinder may be developed and its radius caused to stretch to infinity. Under these conditions, the frames are distributed on the same plane (FIG. 6). The developed cylinder 3 (FIG. 2) becomes the parallelepiped 3' (FIG. 6). The tank becomes transposed into an infinite radius, and gives a volume whereof the surface is a rectangle 1'.

The frames 4 have become fixed, and the row or rows of rinsing jets 41' are movable, and they move facing the frames during cleaning. The filtering frames 4' may also be symmetrically developed with respect to the vat 3' which receives the clarified liquid in a tank symmetrical to 1', illustrated in dash-dotted line.

In order to make still better use of 151 volume and to obtain maximum efficiency with the least possible idle periods, it is advantageous (FIGS. 7 and 8) to provide a tank 1 whereof the cylindrical part 1a serves to support the filtering frames 4b, the apices of which are directed towards the center of 112 said tank 1. The said filtering frames 4b face the frames 4a disposed on the support 3b which is fast with the cylinder 3a, the latter being set in rotation by the reduction-gear drive 43 on each cleaning phase. A tank '- CONSTITUTES THE LOWER ENVELOPE OF THE ENVELOPE OF THE ELEMENTS IN WHICH THE FILTRATE ACCUMULATES, THE SAID FILTRATE BEING DISCHARGED AS ALREADY DESCRIBED BY THE VALVE ( AT THE START OF THE OPERATION AND SUBSEQUENTLY BY THE VALVE -) AND VIA THE CONDUIT %&. The parts upstream of the filtering frames 4a, 4b are filled via the valve 50, and the said upstream parts are drained via the valve 58 before rinsing is started by way of the ramps of jets 41 disposed on the one hand in a recess between the fixed frames 4b and on the other hand in a recess in the rotating frames 4a and governed by the valve 42.

This arrangement of the frames 4a, 4b and the rows of cleaning jets 41 results in particular in better cleaning. In order to obtain this result, it is in fact as well to project the cleaning jets 41a, 41b at an angle $\phi$ on to the surfaces 4c and 4d of the filtering frames, which amounts to providing each row 41 with jets 41a, 41b, some directed on to the surfaces 4c and others on to the surfaces 4d. Experience has shown that an angle $\phi$ of 8° to 12° gives good results. However, it is necessary to provide an interstice $e_2$ between the frames 4 in order to prevent the fibers from accumulating in the base between the frames 4, and to truncate the said frames by a value of $e_1$ in order to prevent the pointed end of the frames 4 from masking the jet and in order that the latter may reach the base of the interframe space. Under these conditions, the angle $\phi$ of the surfaces 4c, , 4d must be 4° to 6° with respect to the radius R. In order then to obtain the maximum filtering surface for a minimum tank volume, the ratio of frame-height $h$ to the diameter D is chosen as $h/D \approx 0.1$ to $0.2$, D being the diameter of the apices of the frames pointing outwards. Likewise, the ratio of $h/D_1 \approx 0.2$ for the frames pointing towards the center, $D_1$ being the diameter of the bases of the said frames (FIG. 10).

The idea of arranging the filtering frames facing one another on external and internal supports may clearly be developed in accordance with FIG. 11 by providing fixed supports 1a, 1b, the former to receive the frames 4b pointing towards the center and the latter to receive the frames 4a pointing outwards, a rotating support 3b being arranged between the supports 1a, 1b and likewise provided with frames 4a, 4b pointing outwards and towards the centers respectively. Rows of cleaning jets are arranged as already described in recesses between the frames. The filtrate is then picked up on the interstice in the support 36, outside the support 1a and inside the support 1b.

In order to make the appliance work at maximum efficiency, a proposed installation (FIG. 12) comprises a first reservoir 47 arranged with a head above the appliance 1, 3. The said reservoir 47 is fed in practically continuous fashion by the pump 45 which draws its supply from the vat 54. The delivery of this pump 45 corresponds substantially to the mean delivery passing through the filtering frames, while the reservoir 47 provides a reserve delivery at the beginning of the cycle when the instantaneous delivery of the filters is still large. A second reservoir 59 is disposed below the appliance. It picks up the unused first filtrate passing through the valve 9 and the quantity of liquid still in the upstream part of the filters at the instant of cleaning by opening the valve 58. The liquid in the reservoir 59 is returned to the reservoir 47 by the pump 60. A compartment 59a makes it possible to retain some of the liquid, which is used to supply the ramps of cleaning jets.

It should be noted that this installation enables very large instantaneous deliveries to be conveyed while limiting to a minimum the driving force of the pumps, which only have to supply a limited continuous delivery, and while reducing to a minimum the idle periods for draining and cleaning the appliance.

Having thus described my invention I claim:

1. Intermittently operable filtering apparatus for clarifying liquids contaminated with materials in suspension, such as waste water from paper machines, said apparatus comprising a tank; filter means in said tank and comprising a plurality of adjacent filter elements each including a rectangular upright frame having laterally projecting vertically extending ribs having outer free edges and a filter medium surrounding said frame and engaging the outer edges of said ribs and defining with the latter a plurality of filtering passages; a filtrate collector communicating with said passages; an inlet conduit communicating with said tank for feeding liquid to be clarified into said tank so that the liquid will pass through the filter media and said filtrate passages into said filtrate collector while the material suspended in the liquid will form a filter cake of gradually increasing thickness on the outer surfaces of said filter media; means for intermittently removing said filter cake from said outer surfaces after the cake has reached a given thickness and comprising at least one upright row of jets for directing liquid at a predetermined angle against the surfaces of said filter media; moving means connected to at least one of said aforementioned means for moving the same relative to each other so that said jets will impinge on the outer surfaces of the filter media of each filter element; valve-controlled outlet means at the bottom of said tank for discharging the material thus removed from the filter elements from the tank; an outlet conduit communicating with said filtrate collector and terminating into two branch conduits for respectively discharging cloudy filtrate passing into said collector immediately after removing of the filter cake from said filter elements and clear filtrate passing into the collector after a filter cake has formed on said filter elements; a valve in each of said branch conduits; and means for checking the translucency of the filtrate passing through said outlet conduit and cooperating with said valves for closing the valve in said clear filtrate branch conduit and for opening the valve in said cloudy filtrate branch conduit when the translucency is below a predetermined value and for opening the valve in said clear filtrate branch conduit and for closing the valve in the other branch conduit when the translucency reaches said predetermined value.

2. Apparatus as defined in claim 1, wherein said tank is a cylindrical tank having a vertical axis and wherein said filtrate collector is likewise cylindrical and arranged concentric with said axis, said filter elements being supported on said filtrate collector and projecting radially therefrom.

3. Apparatus as defined in claim 2, wherein said row of jets is stationarily arranged in said tank and said filtrate collector with the filter elements thereon is turnable about said axis.

4. Apparatus as defined in claim 2, wherein the ratio of the diameter of the tank to the dimension of the filter frames in radial direction is substantially 0.25.

5. Apparatus as defined in claim 1, and comprising at least two concentric cylindrical supports for said filter elements, said filter elements projecting from one of the supports radially inwardly and from the other radially outwardly, at least one of said supports being mounted turnably about its axis.

6. Apparatus as defined in claim 5, wherein at least one row of jets is arranged on each of said supports in a recess provided between adjacent filter elements thereon for respectively directing fluid against the filter elements on the other support.

7. Apparatus as defined in claim 1, wherein said filter elements are arranged laterally spaced from each other, wherein the outer surfaces of said filter media on opposite sides of each frame include an acute angle with each other, and wherein said jets are arranged to impinge at an angle of about 10° against said outer surfaces.

8. Apparatus as defined in claim 1, wherein said tank and said filtrate collector are of substantially rectangular configuration, said filter elements are arranged spaced from each other in a row in said tank, and wherein said moving means is connected to said row of jets for moving the latter past the row of filter elements.

9. Apparatus as defined in claim 1, wherein said means for checking the translucency of said filtrate comprises means for producing a first signal corresponding to the translucency of the filtrate passing through said filtrate outlet, an amplifier for said signal, means for producing a second reference signal, comparator means for comparing said signals and producing an output signal, and means connected to said comparator means and receiving said output signal for controlling said valves in dependence on the output signal of said comparator means.

* * * * *